United States Patent
Singh et al.

(10) Patent No.: US 12,263,704 B2
(45) Date of Patent: Apr. 1, 2025

(54) TIRE IRREGULAR WEAR DETECTION SYSTEM AND METHOD

(71) Applicant: The Goodyear Tire & Rubber Company, Akron, OH (US)

(72) Inventors: Kanwar Bharat Singh, Bofferdange (LU); Pieter-Jan Derluyn, Kehlen (LU)

(73) Assignee: The Goodyear Tire & Rubber Company, Akron, OH (US)

( * ) Notice: Subject to any disclaimer, the term of this patent is extended or adjusted under 35 U.S.C. 154(b) by 290 days.

(21) Appl. No.: 18/053,786

(22) Filed: Nov. 9, 2022

(65) Prior Publication Data
US 2023/0173852 A1    Jun. 8, 2023

Related U.S. Application Data

(60) Provisional application No. 63/286,131, filed on Dec. 6, 2021.

(51) Int. Cl.
*B60C 11/24* (2006.01)
*G01P 15/02* (2013.01)

(52) U.S. Cl.
CPC ............ *B60C 11/246* (2013.01); *G01P 15/02* (2013.01)

(58) Field of Classification Search
CPC ....... B60C 11/243; B60C 11/246; G01P 15/02
See application file for complete search history.

(56) References Cited

U.S. PATENT DOCUMENTS

| | | | |
|---|---|---|---|
| 4,364,267 A * | 12/1982 | Love, Jr. | G01G 19/025 73/146 |
| 5,749,984 A | 5/1998 | Frey et al. | |
| 5,864,056 A | 1/1999 | Bell et al. | |
| 6,083,268 A | 7/2000 | Kelsey et al. | |

(Continued)

FOREIGN PATENT DOCUMENTS

| CN | 101183402 A | 5/2008 |
|---|---|---|
| CN | 106248401 A | 12/2016 |

(Continued)

OTHER PUBLICATIONS

Zhou Haibin, Prediction of wear life of engineering tires, Prediction of wear life of engineering tires, Jun. 30, 2004, 36-40, 46, 6, World Rubber Industry.

(Continued)

*Primary Examiner* — Kristina M Deherrera
*Assistant Examiner* — Gedeon M Kidanu
(74) *Attorney, Agent, or Firm* — Edward T. Kennedy

(57) ABSTRACT

An irregular wear detection system for a tire supporting a vehicle includes a sensor unit mounted on the tire. The sensor unit includes a footprint centerline length measurement sensor to measure a centerline length of a footprint of the tire. A processor is in electronic communication with the sensor unit and receives a plurality of measured centerline lengths over time. An analysis module is stored on the processor and receives the measured centerline lengths as inputs. The analysis module detects irregular wear of the tire from the measured footprint centerline lengths. An irregular wear determination is generated by the analysis module when the measured footprint centerline lengths remain the same or increase.

20 Claims, 10 Drawing Sheets

(56) References Cited

U.S. PATENT DOCUMENTS

| | | |
|---|---|---|
| 6,430,993 B1 | 8/2002 | Seta |
| 6,532,812 B2 | 3/2003 | King |
| 6,591,668 B1 | 7/2003 | Becherer et al. |
| 6,883,962 B2 | 4/2005 | Kurata |
| 7,158,018 B2 | 1/2007 | Schick |
| 7,299,694 B2 | 11/2007 | Byrne |
| 7,404,318 B2 | 7/2008 | Merino-Lopez et al. |
| 7,523,656 B1 | 4/2009 | Blixhavn et al. |
| 7,543,491 B2 | 6/2009 | Hammerschmidt et al. |
| 7,568,384 B2 | 8/2009 | Morinaga |
| 7,577,532 B2 | 8/2009 | Ichikawa et al. |
| 7,673,505 B2 | 3/2010 | Hammerschmidt |
| 7,680,610 B2 | 3/2010 | Miyashita et al. |
| 7,755,367 B2 | 7/2010 | Schoen et al. |
| 8,049,515 B2 | 11/2011 | Schoen et al. |
| 8,065,911 B2 | 11/2011 | Taylor et al. |
| 8,096,172 B2 | 1/2012 | Gotschlich |
| 8,371,159 B2 | 2/2013 | Morinaga |
| 8,402,821 B2 | 3/2013 | Fink et al. |
| 8,443,660 B2 | 5/2013 | Grande et al. |
| 8,483,976 B2 | 7/2013 | Morinaga |
| 8,555,698 B2 | 10/2013 | Neugebauer et al. |
| 8,558,680 B2 | 10/2013 | Pannek |
| 8,775,017 B2 | 7/2014 | Brusarosco et al. |
| 8,794,058 B2 | 8/2014 | Bigot et al. |
| 8,833,410 B2 | 9/2014 | Paturle |
| 8,849,500 B2 | 9/2014 | Gokyu et al. |
| 8,881,573 B2 | 11/2014 | Paturle et al. |
| 8,892,298 B2 | 11/2014 | Paturle et al. |
| 8,904,869 B2 | 12/2014 | Paturle |
| 9,052,257 B2 | 6/2015 | Shibata |
| 9,423,320 B2 | 8/2016 | Kuramoto et al. |
| 9,513,192 B2 | 12/2016 | Kretschmann et al. |
| 9,669,664 B2 | 6/2017 | Kretschmann |
| 9,873,293 B2 | 1/2018 | Singh et al. |
| 9,908,374 B2 | 3/2018 | Dussinger et al. |
| 9,921,134 B2 | 3/2018 | Unterreiner et al. |
| 9,962,999 B2 | 5/2018 | Roty |
| 9,963,146 B2 | 5/2018 | Singh et al. |
| 9,994,082 B2 | 6/2018 | Seboe et al. |
| 10,000,100 B2 | 6/2018 | Weston |
| 10,005,328 B2 | 6/2018 | Makino et al. |
| 10,024,765 B2 | 7/2018 | Neau |
| 10,082,381 B2 | 9/2018 | McMillen |
| 10,112,444 B2 | 10/2018 | Takahashi et al. |
| 10,132,719 B2 | 11/2018 | Fudulea |
| 10,207,551 B2 | 2/2019 | Benbouhout et al. |
| 10,222,299 B2 | 3/2019 | Ledoux et al. |
| 10,245,906 B2 | 4/2019 | Singh et al. |
| 10,252,583 B2 | 4/2019 | Kandler et al. |
| 10,259,274 B2 | 4/2019 | Lange et al. |
| 10,286,734 B2 | 5/2019 | Masago |
| 10,286,735 B2 | 5/2019 | Guinart et al. |
| 10,328,755 B2 | 6/2019 | Tebano et al. |
| 10,350,949 B2 | 7/2019 | Surendra |
| 10,399,396 B2 | 9/2019 | Limbrunner et al. |
| 10,471,779 B2 | 11/2019 | Masago |
| 10,495,457 B2 | 12/2019 | Cyllik et al. |
| 10,513,156 B2 | 12/2019 | Hrabal |
| 10,603,962 B2 | 3/2020 | Singh |
| 2004/0049303 A1 | 3/2004 | Levy et al. |
| 2006/0114107 A1 | 6/2006 | Kim et al. |
| 2006/0201240 A1 | 9/2006 | Morinaga |
| 2006/0208902 A1 | 9/2006 | Brey |
| 2012/0273102 A1 | 11/2012 | Paturle |
| 2015/0040656 A1 | 2/2015 | Singh et al. |
| 2015/0090023 A1 | 4/2015 | Masago |
| 2015/0174953 A1* | 6/2015 | Cron .................. B60C 7/18 152/11 |
| 2015/0247780 A1 | 9/2015 | Kretschmann et al. |
| 2016/0129737 A1* | 5/2016 | Singh .................. B60W 40/13 73/146.3 |
| 2017/0124784 A1 | 5/2017 | Wittman et al. |
| 2018/0066929 A1 | 3/2018 | Kandler et al. |
| 2018/0154707 A1 | 6/2018 | Singh |
| 2018/0180463 A1 | 6/2018 | Cyllik et al. |
| 2018/0253109 A1 | 9/2018 | Fontaine et al. |
| 2018/0272813 A1 | 9/2018 | Singh |
| 2019/0009618 A1 | 1/2019 | Mcpillan et al. |
| 2019/0025113 A1 | 1/2019 | Masago |
| 2019/0184763 A1 | 6/2019 | Pulford et al. |
| 2019/0193479 A1 | 6/2019 | Pulford et al. |
| 2019/0270347 A1 | 9/2019 | Stewart et al. |
| 2019/0304084 A1 | 10/2019 | Oblizajek |
| 2019/0382034 A1 | 12/2019 | Miller et al. |
| 2020/0001662 A1 | 1/2020 | Storti et al. |
| 2020/0023693 A1 | 1/2020 | Ochi et al. |
| 2020/0031183 A1 | 1/2020 | Kim |
| 2020/0047571 A1 | 2/2020 | Oblizajek |
| 2020/0062268 A1 | 2/2020 | Steiner |
| 2020/0070589 A1 | 3/2020 | Kuerzl et al. |
| 2020/0094634 A1 | 3/2020 | Decoster et al. |
| 2020/0126323 A1 | 4/2020 | Ledoux et al. |
| 2020/0182746 A1 | 6/2020 | Singh |
| 2021/0008933 A1 | 1/2021 | Kretschmann et al. |
| 2021/0061020 A1* | 3/2021 | Singh .................. B60C 11/243 |
| 2021/0061021 A1* | 3/2021 | Singh .................. B60C 11/246 |
| 2021/0061022 A1* | 3/2021 | Singh .................. B60C 11/243 |
| 2021/0101416 A1* | 4/2021 | Kim .................... G01M 17/02 |
| 2022/0016939 A1* | 1/2022 | Doraiswamy .......... G06N 3/084 |

FOREIGN PATENT DOCUMENTS

| | | |
|---|---|---|
| CN | 109472885 A | 3/2019 |
| DE | 102013208553 A1 | 11/2014 |
| DE | 102013220882 A1 | 4/2015 |
| DE | 102014214626 A1 | 1/2016 |
| DE | 102017221142 A1 | 5/2019 |
| EP | 3318422 A1 | 5/2018 |
| JP | 2011168211 A | 9/2011 |
| JP | 2013136297 A | 7/2013 |
| JP | 2013169816 A | 9/2013 |
| JP | 2016137847 A | 8/2016 |
| KR | 101741730 B1 | 6/2017 |
| WO | 2015055429 A1 | 4/2015 |
| WO | 2019186353 A1 | 10/2019 |
| WO | 2019239305 A3 | 2/2020 |
| WO | 2020070051 A1 | 4/2020 |
| WO | WO-2020205703 A1 * | 10/2020 ........... B60C 11/243 |

OTHER PUBLICATIONS

Zhu Chunxia, et al, Computer simulation of radial tire wear, Computer simulation of radial tire wear, Feb. 1, 2008, 57-58, 2, Research on Agricultural Mechanization.

Search Report for corresponding European application.

* cited by examiner

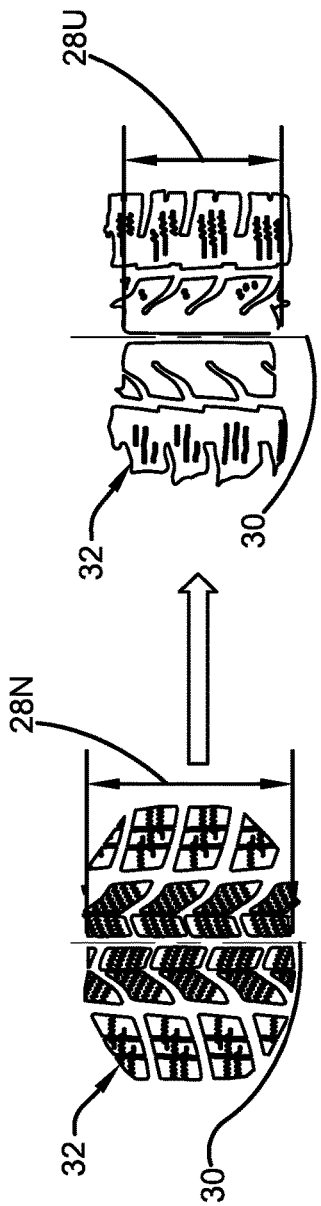
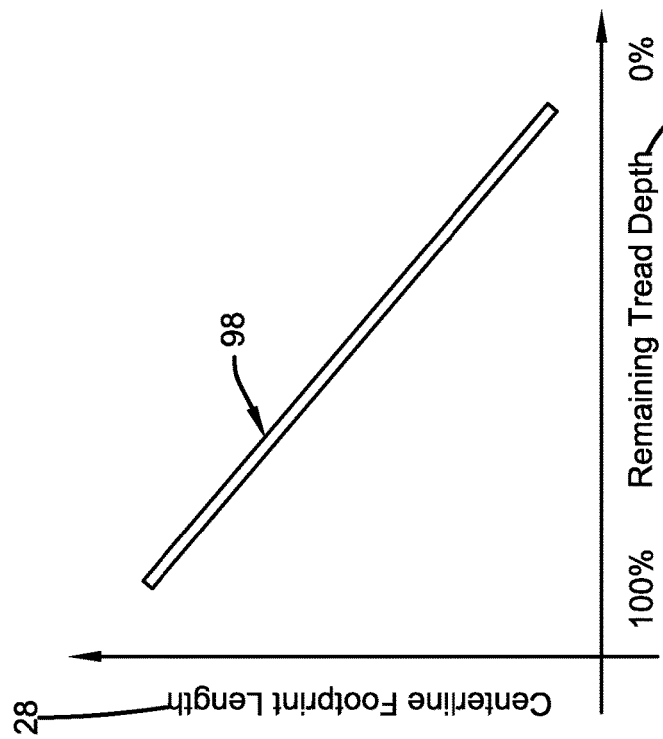
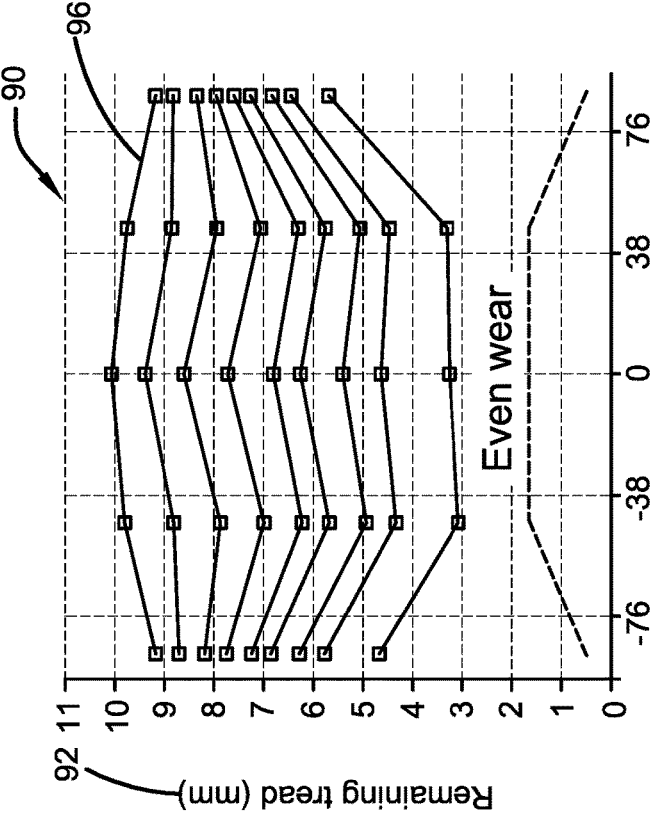

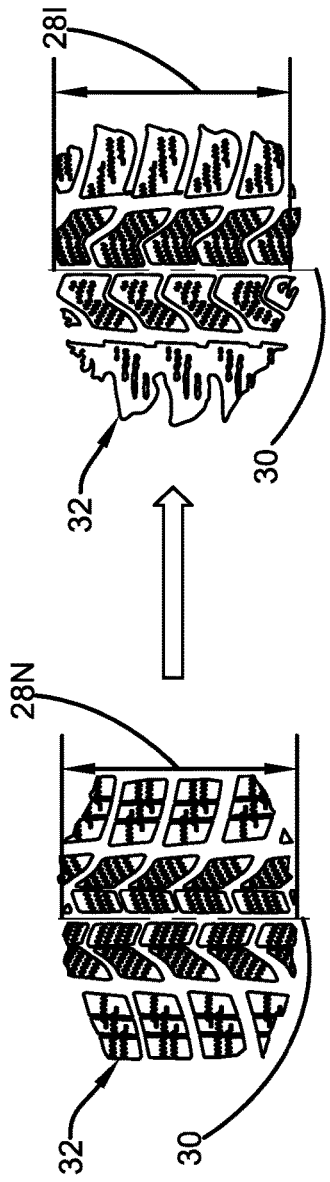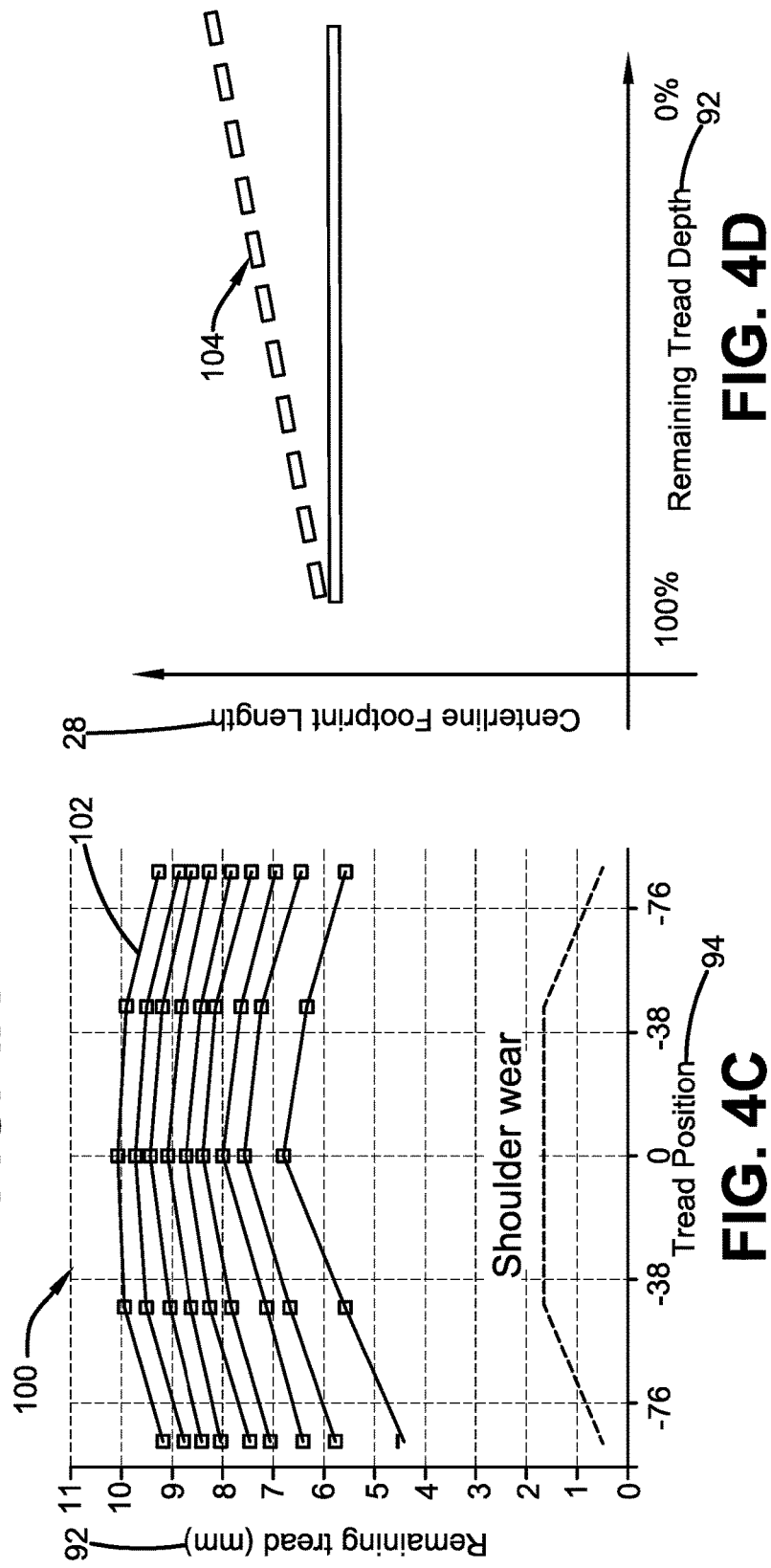

TIRE IRREGULAR WEAR DETECTION SYSTEM AND METHOD

FIELD OF THE INVENTION

The invention relates generally to tire monitoring systems. More particularly, the invention relates to systems that monitor tire wear. Specifically, the invention is directed to a system and method for detecting irregular wear of a tire wear based upon the length of the footprint of the tire.

BACKGROUND OF THE INVENTION

Tire wear plays an important role in vehicle factors such as safety, reliability, and performance. Tread wear, which refers to the loss of material from the tread of the tire, directly affects such vehicle factors. As a result, it is desirable to monitor the tread wear experienced by a tire. It is to be understood that, for the purpose of convenience, the terms "tread wear" and "tire wear" may be used interchangeably.

One approach to the monitoring of tread wear has been through the use of wear sensors disposed in the tire tread, which has been referred to as a direct method or approach. The direct approach to monitoring tire wear from tire-mounted sensors has multiple challenges. Placing the sensors in an uncured or "green" tire to then be cured at high temperatures may cause damage to the wear sensors. In addition, sensor durability can prove to be an issue in meeting the millions of cycles requirement for tires. Moreover, wear sensors in a direct monitoring approach must be small enough not to cause any uniformity problems as the tire rotates at high speeds. Finally, wear sensors can be expensive and add significantly to the cost of the tire.

Due to such challenges, alternative approaches have been developed, which involve prediction of tread wear over the life of the tire, including indirect estimations of the tire wear state. These alternative approaches have experienced certain disadvantages in the prior art due to a lack of optimum prediction techniques, which reduces the accuracy and/or reliability of the tread wear predictions. For example, many such techniques involve data or information that is not easily obtained, such as non-standard vehicle system signals, or data that is not accurate under all driving conditions.

In addition, certain prior art techniques of indirectly estimating tire wear involve obtaining data from the vehicle controller area network, which is referred to in the art as the vehicle CAN bus. It may be undesirably difficult to access or utilize the vehicle CAN bus in an economical and reliable manner.

Furthermore, prior art indirect techniques do not detect uneven or irregular wear of the tread. More particularly, in order to maintain optimum grip or traction as the tire wears, it is desirable for the tread to wear uniformly across the width of the tire. Uneven or irregular tire wear occurs when the tread wears more rapidly at one or both shoulders than at the center of the tread. Such irregular wear may be caused by improper alignment of the tires on the vehicle and/or improper inflation, and may compromise the traction or life of the tire. It is therefore advantageous to detect irregular wear of a tire with an indirect technique.

As a result, there is a need in the art for a system and method that accurately and reliably detects irregular wear of a tire using easily obtained and accurate parameters.

SUMMARY OF THE INVENTION

According to an aspect of an exemplary embodiment of the invention, an irregular wear detection system for a tire supporting a vehicle is provided. The system includes a sensor unit that is mounted on the tire. The sensor unit includes a footprint centerline length measurement sensor to measure a centerline length of a footprint of the tire. A processor is in electronic communication with the sensor unit and receives a plurality of measured centerline lengths over time. An analysis module is stored on the processor and receives the measured centerline lengths as inputs. The analysis module detects irregular wear of the tire from the measured footprint centerline lengths. An irregular wear determination is generated by the analysis module when the measured footprint centerline lengths remain the same or increase.

According to another aspect of an exemplary embodiment of the invention, a method for detecting irregular wear of a tire supporting a vehicle is provided. The method includes the step of mounting a sensor unit on the tire. The sensor unit includes a footprint centerline length measurement sensor. A centerline length of a footprint of the tire is measured with the footprint centerline length measurement sensor. A processor is provided in electronic communication with the sensor unit, and the processor receives a plurality of measured centerline lengths over time. An analysis module is stored on the processor and the measured centerline lengths are received in the analysis module as inputs. Irregular wear of the tire is detected from the measured footprint centerline lengths, and an irregular wear determination is generated with the analysis module when the measured footprint centerline lengths remain the same or increase.

BRIEF DESCRIPTION OF THE DRAWINGS

The invention will be described by way of example and with reference to the accompanying drawings, in which:

FIG. 3A is a plan view of a footprint of the tire shown in FIG. 1 in a new condition;

FIG. 3B is a plan view of a footprint of the tire shown in FIG. 1 in a worn condition with uniform wear;

FIG. 3C is a graphical representation of a wear distribution plot for a tire experiencing uniform wear;

FIG. 3D is a graphical representation of footprint centerline length versus remaining tread depth for a tire experiencing uniform wear;

FIG. 4A is a plan view of a footprint of the tire shown in FIG. 1 in a new condition;

FIG. 4B is a plan view of a footprint of the tire shown in FIG. 1 in a worn condition with irregular wear;

FIG. 4C is a graphical representation of a wear distribution plot for a tire experiencing irregular wear;

FIG. 4D is a graphical representation of footprint centerline length versus remaining tread depth for a tire experiencing irregular wear;

Similar numerals refer to similar parts throughout the drawings.

Definitions

"ANN" or "artificial neural network" is an adaptive tool for non-linear statistical data modeling that changes its structure based on external or internal information that flows through a network during a learning phase. ANN neural networks are non-linear statistical data modeling tools used to model complex relationships between inputs and outputs or to find patterns in data.

"Axial" and "axially" means lines or directions that are parallel to the axis of rotation of the tire.

"CAN bus" is an abbreviation for controller area network.

"Circumferential" means lines or directions extending along the perimeter of the surface of the annular tread perpendicular to the axial direction.

"Cloud computing" or "cloud" means computer processing involving computing power and/or data storage that is distributed across multiple data centers, which is typically facilitated by access and communication using the Internet.

"Equatorial centerplane (CP)" means the plane perpendicular to the axis of rotation of the tire and passing through the center of the tread.

"Footprint" means the contact patch or area of contact created by the tire tread with a flat surface as the tire rotates or rolls.

"Inboard side" means the side of the tire nearest the vehicle when the tire is mounted on a wheel and the wheel is mounted on the vehicle.

"Lateral" means an axial direction.

"Outboard side" means the side of the tire farthest away from the vehicle when the tire is mounted on a wheel and the wheel is mounted on the vehicle.

"Radial" and "radially" means directions radially toward or away from the axis of rotation of the tire.

"Rib" means a circumferentially extending strip of rubber on the tread which is defined by at least one circumferential groove and either a second such groove or a lateral edge, the strip being laterally undivided by full-depth grooves.

"Tread element" or "traction element" means a rib or a block element defined by a shape having adjacent grooves.

DETAILED DESCRIPTION OF THE INVENTION

With reference to FIGS. 1 through 9, an exemplary embodiment of the tire irregular wear detection system of the present invention is indicated at 10. The tire irregular wear detection system 10 and an accompanying method are referred herein as an "indirect" system and method. The system 10 and method utilize an indirect approach to detect irregular wear of a tire and avoid issued associated with the use of sensors mounted directly to the tire tread.

Figure 1:
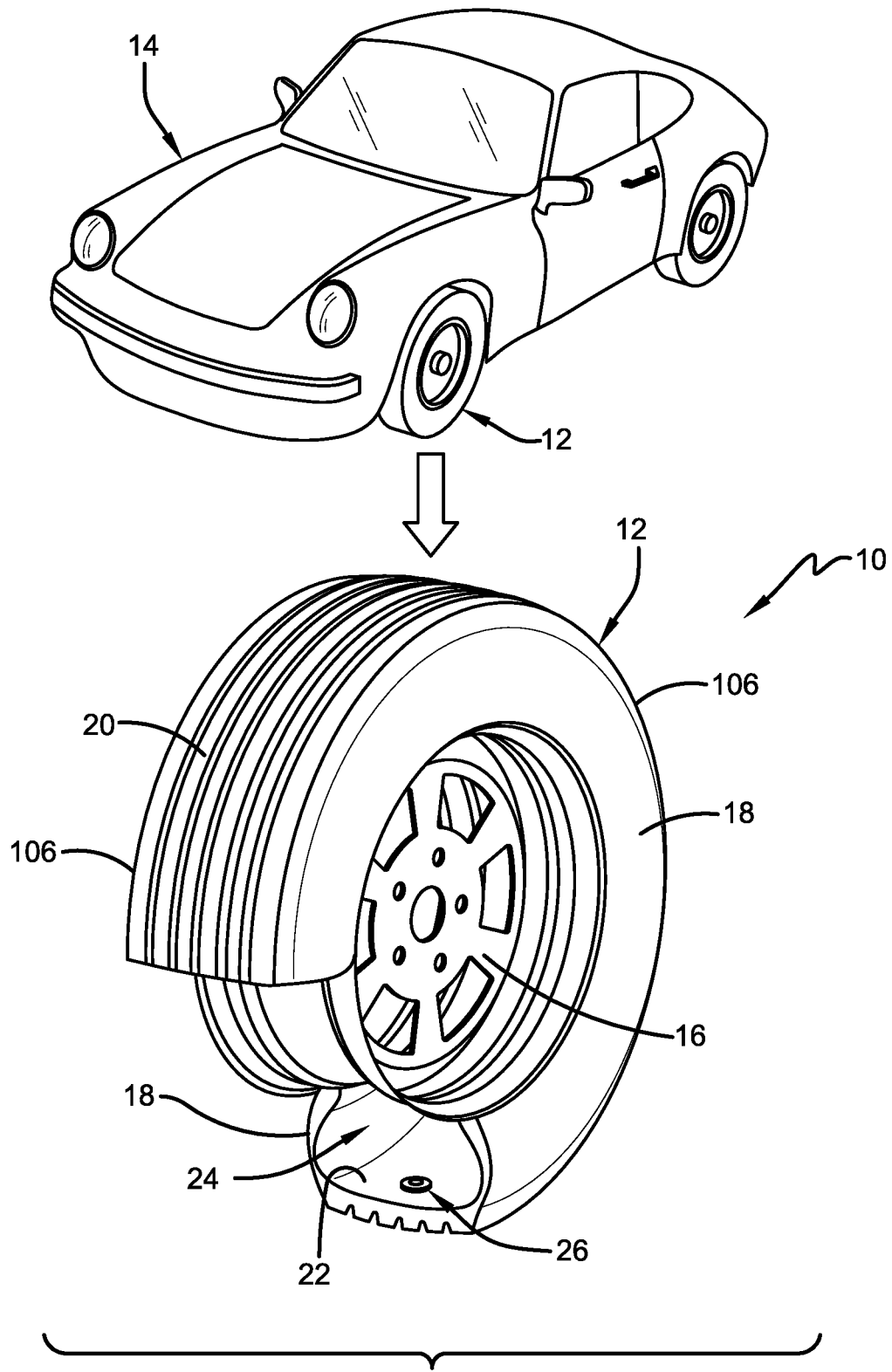
FIG. 1 is a schematic perspective view of a vehicle that includes a tire employing an exemplary embodiment of the tire irregular wear detection system of the present invention.

With particular reference to FIG. 1, the system 10 detects irregular wear on each tire 12 supporting a vehicle 14. For the purpose of convenience, the system 10 is described with reference to one tire 12, with the understanding that the description applies to each tire supporting the vehicle 14. In addition, while the vehicle 14 is depicted as a passenger car, the invention is not to be so restricted. The principles of the invention find application in other vehicle categories, such as commercial trucks, in which vehicles may be supported by more or fewer tires than those shown in FIG. 1.

The tires 12 are of conventional construction, and each tire is mounted on a respective wheel 16 as known to those skilled in the art. Each tire 12 includes a pair of sidewalls 18 that extend to a circumferential tread 20, which wears with age from road abrasion. An innerliner 22 is disposed on the inner surface of the tire 12, and when the tire is mounted on the wheel 16, an internal cavity 24 is formed, which is filled with a pressurized fluid, such as air.

A sensor unit 26 is attached to the innerliner 22 of each tire 12 by means such as an adhesive, and measures certain parameters or conditions of the tire, as will be described in greater detail below. It is to be understood that the sensor unit 26 may be attached in such a manner, or to other components of the tire 12, such as on or in one of the sidewalls 18, on or in the tread 20, on the wheel 16, and/or a combination thereof. For the purpose of convenience, reference herein shall be made to mounting of the sensor unit 26 on the tire 12, with the understanding that such mounting includes all such attachment.

The sensor unit 26 is mounted on each tire 12 for the purpose of detecting certain real-time tire parameters, such as tire pressure 38 (FIG. 6) and temperature 40. For this reason, the sensor unit 26 preferably includes a pressure sensor and a temperature sensor, and may be of any known configuration.

Figure 6:
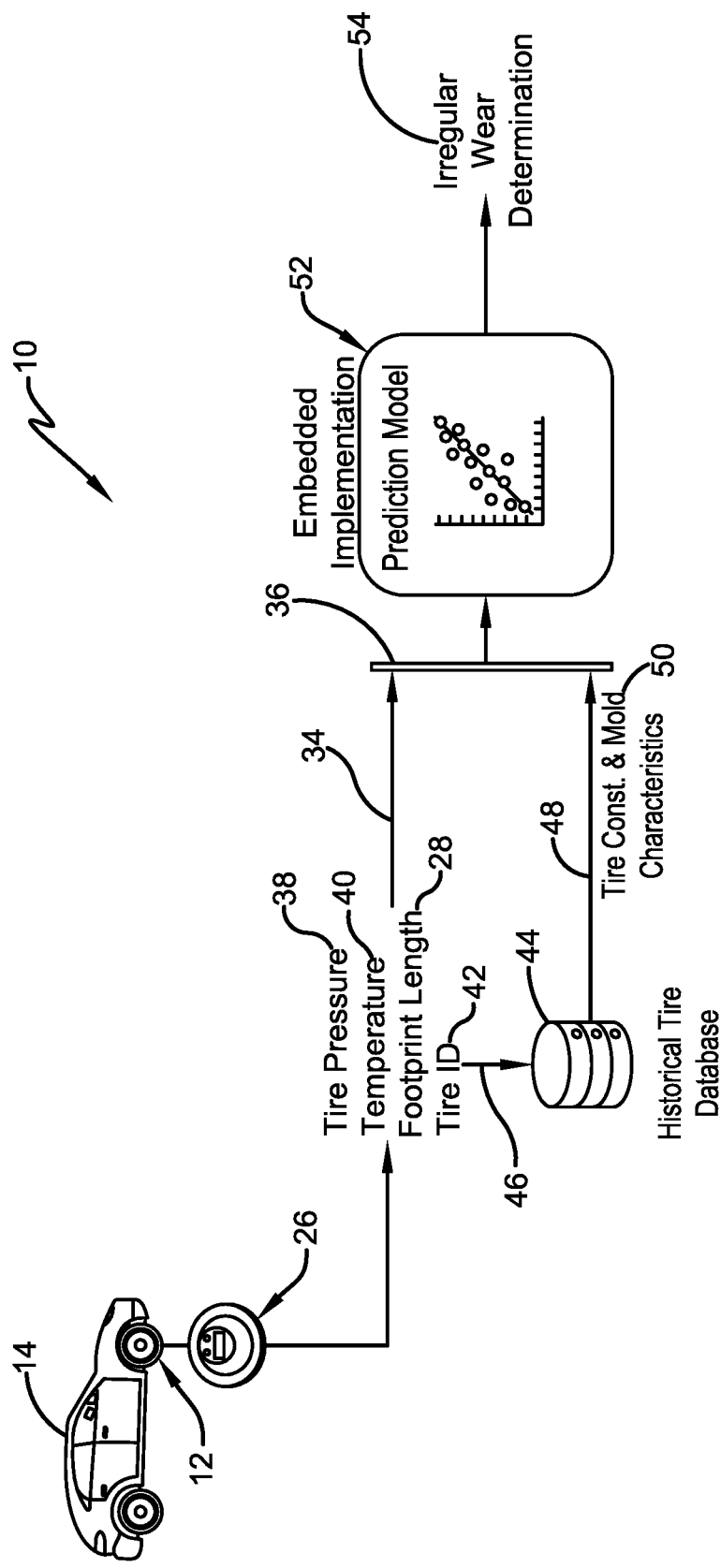
FIG. 6 is a schematic diagram of aspects of an exemplary embodiment of the tire irregular wear detection system of the present invention.

The sensor unit 26 also optionally includes electronic memory capacity for storing identification (ID) information for each tire 12, known as tire ID information and indicated at 42 (FIG. 6). Alternatively, tire ID information 42 may be included in another sensor unit, or in a separate tire ID storage medium, such as a tire ID tag, which preferably is in electronic communication with the sensor unit 26. The tire ID information 42 may include tire parameter and/or manufacturing information, which will be described in greater detail below.

Figure 2:
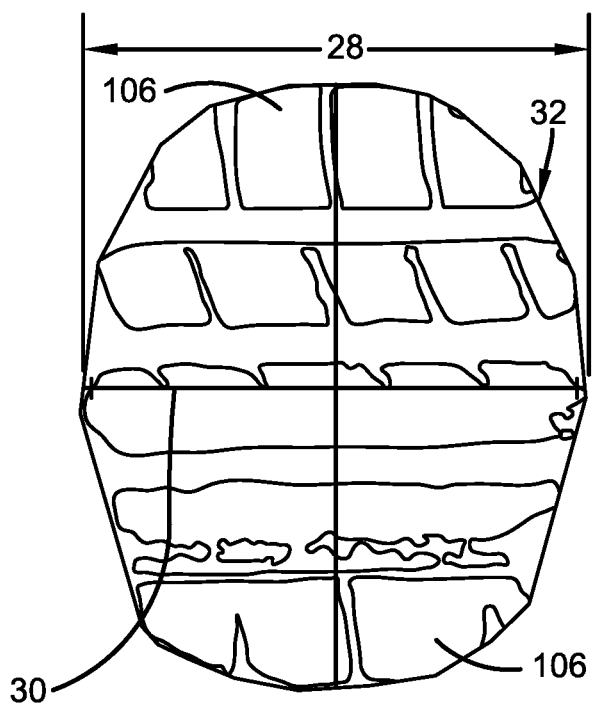
FIG. 2 is a plan view of a footprint of the tire shown in FIG. 1.

Turning to FIG. 2, the sensor unit 26 preferably also measures a length 28 of a centerline 30 of a footprint 32 of the tire 12. More particularly, as the tire 12 contacts the ground, the area of contact created by the tread 20 with the ground is known as the footprint 32. The centerline 30 of the footprint 32 corresponds to the equatorial centerplane of the tire 12, which is the plane that is perpendicular to the axis of rotation of the tire and which passes through the center of the tread 20. The sensor unit 26 thus measures the length 28 of the centerline 30 of the tire footprint 32, which is referred to herein as the footprint centerline length 28. Any suitable technique for measuring the footprint centerline length 28 may be employed by the sensor unit 26. For example, the sensor unit 26 may include a strain sensor or piezoelectric sensor that measures deformation of the tread 20 and thus indicates the footprint centerline length 28.

It is to be understood that the pressure sensor, the temperature sensor, the tire ID capacity and/or the centerline length sensor may be incorporated into the single sensor unit 26, or may be incorporated into multiple units. For the purpose of convenience, reference herein shall be made to a single sensor unit 26.

It has been observed that, as the tire 12 experiences uniform wear, the footprint centerline length 28 decreases. For example, turning to FIG. 3A, the footprint 32 for a new tire includes a footprint centerline length 28N. When the tire experiences uniform wear, as shown in FIG. 3B, the footprint 32 for the worn tire includes a footprint centerline length 28U. The footprint centerline length 28U of the uniformly worn tire is shorter than the footprint centerline length 28N of the new tire 12.

More particularly, with additional reference to FIG. 3C, a wear distribution plot 90 for a tire 12 experiencing uniform wear shows a remaining tread depth 92 versus a position 94 across a width of the tread 20. The resulting lines 96 indicate uniform or even wear across the tread 20. As shown in FIG. 3D, a plot 98 of the footprint centerline length 28 for a tire 12 experiencing uniform wear versus the remaining tread depth 92 shows that the footprint centerline length decreases as the tire wears.

It has been discovered that, when the tire 12 experiences irregular wear, the footprint centerline length 28 increases or shows no change. For example, turning to FIG. 4A, the footprint 32 for a new tire includes the footprint centerline length 28N. When the tire experiences irregular wear, as shown in FIG. 4B, the footprint 32 for the worn tire includes a footprint centerline length 28I. The footprint centerline length 28I of the irregularly worn tire is longer than or is the same as the footprint centerline length 28N of the new tire 12.

More particularly, with additional reference to FIG. 4C, a wear distribution plot 100 for a tire 12 experiencing irregular wear shows the remaining tread depth 92 versus the position 94 across a width of the tread 20. The resulting lines 102 indicate irregular or uneven wear across the tread 20. As shown in FIG. 4D, a plot 104 of the footprint centerline length 28 for a tire 12 experiencing irregular wear versus the remaining tread depth 92 shows that the footprint centerline length increases or remains the same as the tire wears.

Figure 5B:
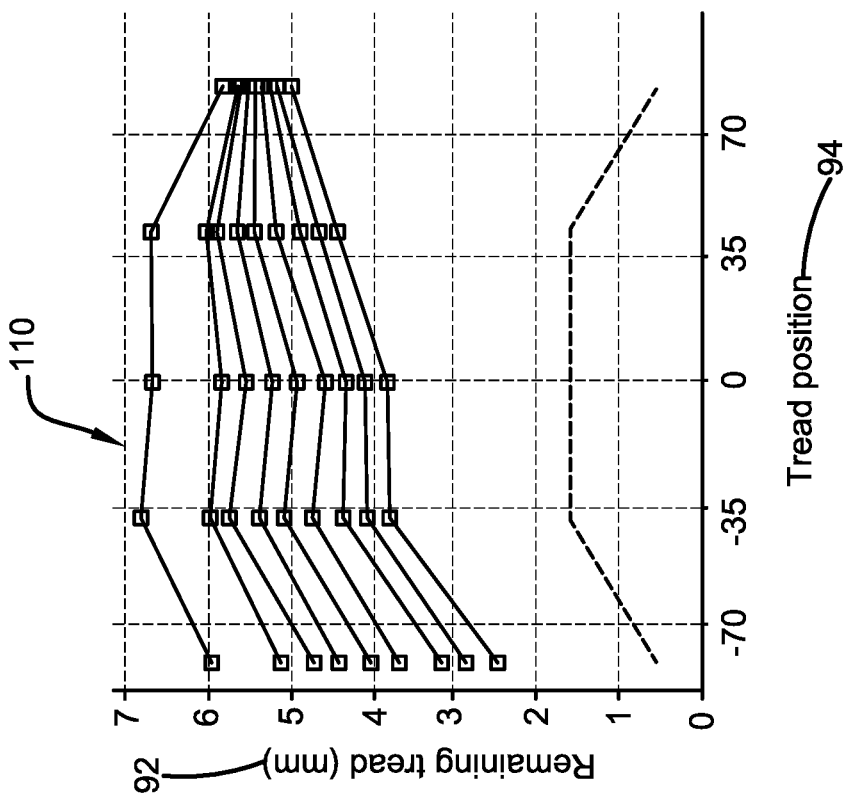
FIG. 5B is a graphical representation of a wear distribution plot for a tire experiencing irregular wear at one shoulder.
Figure 5A:
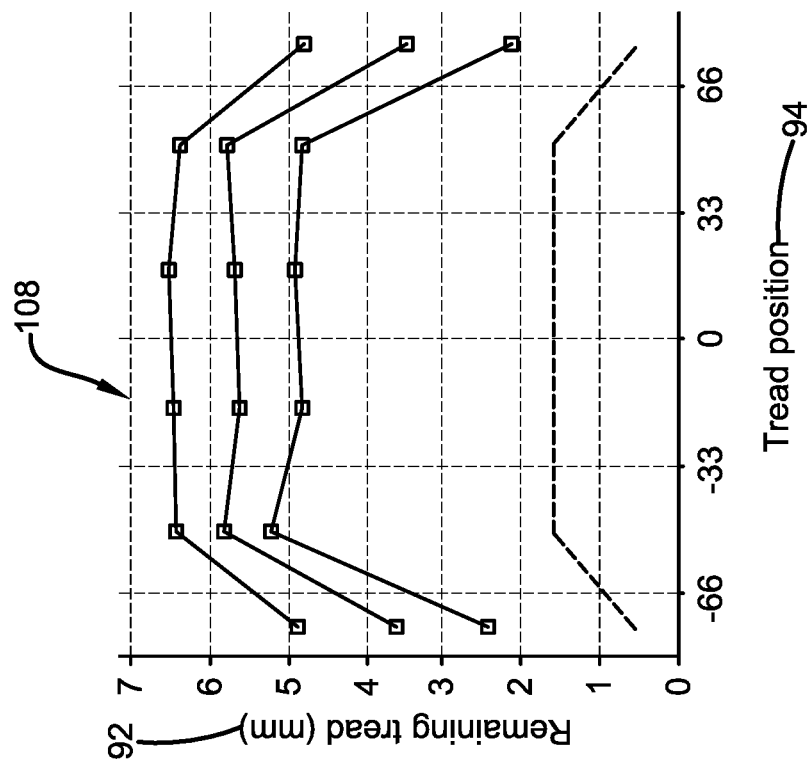
FIG. 5A is a graphical representation of a wear distribution plot for a tire experiencing irregular wear at both shoulders.

Returning to FIGS. 1 and 2, the tread 20 includes a shoulder 106 near each respective sidewall 18. When the tire 12 experiences uneven or irregular wear, the tread 20 wears more rapidly at one or both shoulders 106 than at the centerline 30. FIG. 5A is a wear distribution plot 108 showing irregular wear of the tread 20 at both shoulders 106. Irregular wear of both shoulders 106 is typically caused by uneven contact pressure of the tire 12 with the road surface, which may be due to under-inflation of the tire and/or the design of the tire. FIG. 5B is a wear distribution plot 110 showing irregular wear of the tread 20 at one shoulder 106. Irregular wear of one shoulder 106 is typically caused by excessive positive or negative camber of the tire 12, which is the vertical tilt of the tire with respect to the vehicle 14. As described above, it is beneficial to detect such irregular wear of the tire 12, as it may compromise the traction or life of the tire.

Turning now to FIG. 6, the irregular wear detection system 10 measures the footprint centerline length 28 of the tire 12 to detect irregular wear. More particularly, as mentioned above, the sensor unit 26 measures the footprint centerline length 28, and may measure other tire parameters, such as tire pressure 38 and tire temperature 40. The sensor unit 26 includes transmission means 34 for sending the measured tire parameters, as well as the optional tire ID information 42, to a processor 36. The transmission means 34 may include an antenna for wireless transmission or wires for wired transmission. The processor 36 may be integrated into the sensor unit 26, or may be a remote processor, which may be mounted on the vehicle 14 or may be cloud-based. For the purpose of convenience, the processor 36 will be described as a remote processor mounted on the vehicle 14, with the understanding that the processor may alternatively be cloud-based or integrated into the sensor unit 26.

Aspects of the irregular wear detection system 10 preferably are executed on the processor 36, which enables input of data from the sensor unit 26 and execution of specific analysis techniques and algorithms, to be described below, which are stored in a suitable storage medium and are also in electronic communication with the processor.

In this manner, the sensor unit 26 measures the footprint centerline length 28, and may measure the tire pressure 38 and tire temperature 40, and transmits these measured parameters to the processor 36 with the optional tire ID information 42. When employed, the tire ID information 42 enables a tire construction database 44 to be electronically accessed 46. The tire construction database 44 stores tire construction data 50, which will be described in greater detail below. The database 44 is in electronic communication with the processor 36 and may be stored on the processor, enabling transmission 48 of the tire construction data 50 to the processor 36.

The tire ID information 42 may be correlated to specific construction data 50 for each tire 12, including: the tire type; tire model; size information, such as rim size, width, and outer diameter; manufacturing location; manufacturing date; a treadcap code that includes or correlates to a compound identification; a mold code that includes or correlates to a tread structure identification; a tire footprint shape factor (FSF), a mold design drop; a tire belt/breaker angle; and an overlay material. The tire ID information 42 may also correlate to a service history or other information to identify specific features and parameters of each tire 12, as well as mechanical characteristics of the tire, such as cornering parameters, spring rate, load-inflation relationship, and the like.

An analysis module 52 is stored on the processor 36, and receives the footprint centerline length 28, as well as the tire pressure 38 and tire temperature 40. When the optional tire ID information 42 is employed, the analysis module 52 also receives the tire ID information and the tire construction data 50. The analysis module 52 analyzes these inputs to generate a determination of irregular wear, indicated at 54. For example, the analysis module 52 may compare measurements of the footprint centerline length 28 from the sensor unit 26 over time. Such a comparison may be made using an analytical model, such as a linear regression model or a non-linear regression model. If the footprint centerline length 28 remains the same or increases, the tire 12 is experiencing uneven wear. When the analysis module 52 determines that the tire 12 is experiencing uneven wear, the analysis module generates the irregular wear determination 54.

Figure 7:
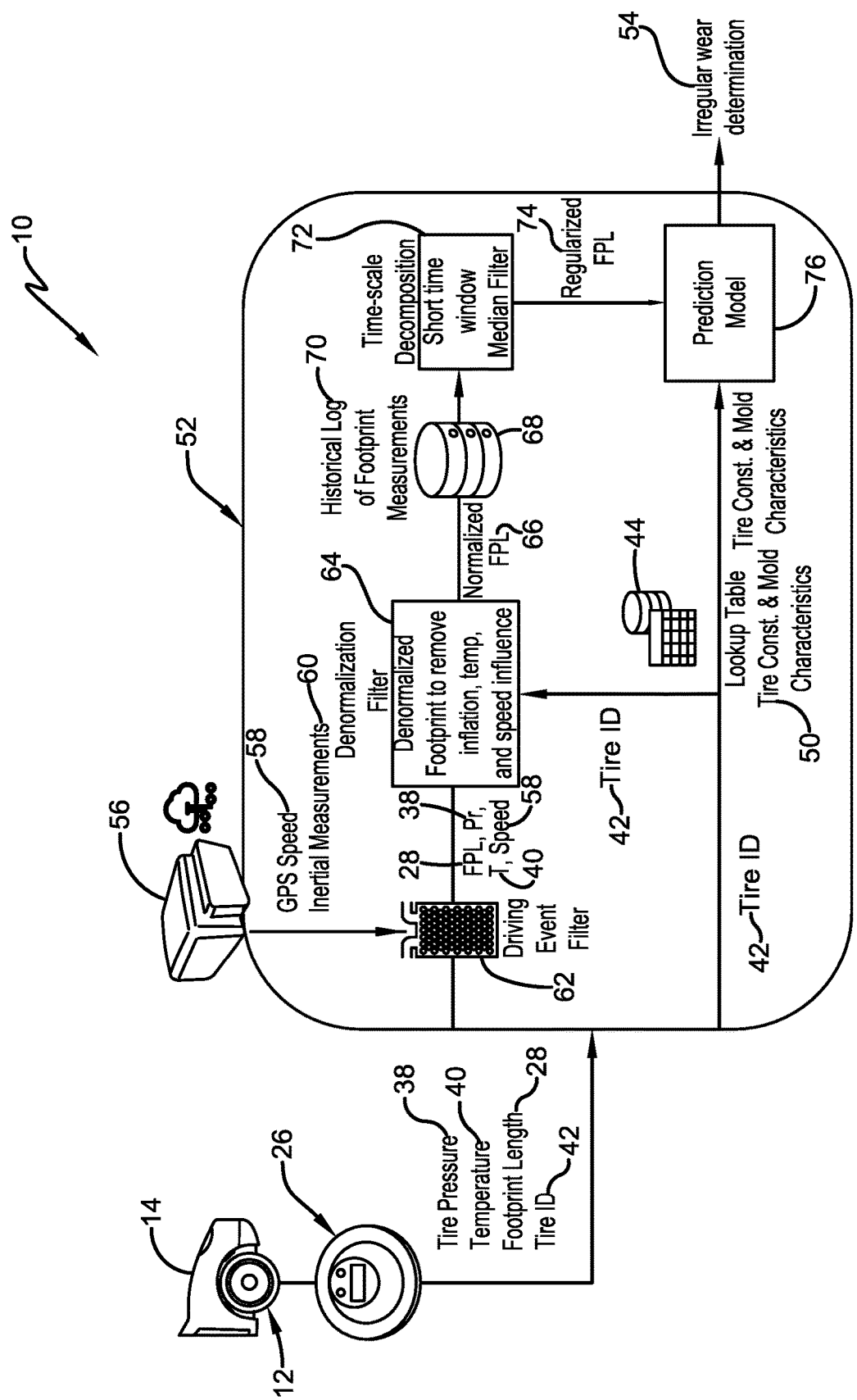
FIG. 7 is a schematic diagram showing optional aspects of the analysis module of the tire irregular wear detection system shown in FIG. 6.

Alternatively, with reference to FIG. 7, the analysis module 52 may employ an event filter 62, a denormalization filter 64, a time filter 72, and/or a prediction model 76, which may improve the accuracy of the irregular wear determination 54. When the analysis module 52 employs an event filter 62, the analysis module 52 receives the tire-based data inputs of tire pressure 38, tire temperature 40, footprint centerline length 28 and the optional tire ID information 42. The analysis module 52 also optionally receives data from a vehicle-mounted collection unit 56. The data from the vehicle-mounted collection unit 56 preferably includes vehicle speed 58, which may be calculated from global positioning system (GPS) data or other suitable source of vehicle speed data, and inertial measurements 60 for the vehicle 14 from an accelerometer.

When the event filter 62 is employed, it is applied to the data received from the vehicle-mounted collection unit 56. More particularly, vehicle conditions are reviewed in the event filter, including the measured vehicle speed 58 from GPS data and the inertial measurements 60. These measured values are compared to threshold values, including upper and lower limits. If the measured values are outside of the threshold values, the system 10 does not proceed, as the vehicle 14 is likely to be operating outside of normal or predictable conditions. If the measured values are within the threshold values, the measured data of tire pressure 38, tire temperature 40, footprint centerline length 28, and vehicle speed 58 may be sent to a denormalization filter 64.

When the denormalization filter 64 is employed, it accounts for the effect of inflation pressure 38, temperature 40 and vehicle speed 58 on the footprint centerline length 28 of the tire 12. In the denormalization filter 64, a pre-trained regression model is used to account for the effects of inflation pressure 38, temperature 40 and vehicle speed 58. Regardless of the vehicle and tire operating conditions, the footprint centerline length 28 is regressed to a pre-defined nominal condition, that is, a pre-defined inflation pressure 38, temperature 40 and vehicle speed 58.

The denormalization filter 64 generates a normalized footprint length 66. Because the footprint centerline length 28 of the tire 12 may also be affected by the vehicle load, it is preferred to account for the effect of load on the normalized footprint length 66. To account for the effect of load on the normalized footprint length 66, an optional historical footprint measurement database 68 may be accessed. The historical footprint measurement database 68 is in electronic communication with the processor 36 and may be stored on the processor, and contains a historical log of footprint measurements 70. The normalized footprint length 66 is correlated to the historical log 70 and an average of the values is taken.

The average of the values is applied to an optional time filter 72. When the time filter 72 is employed, it accounts for time-scale decomposition of the tire 12. More particularly, the time filter 72 accounts for bias due to factors or parameters that may affect the tire 12 over time, and which are not among the above-described measured parameters. The technique employed in the time filter 72 is described in greater detail in U.S. Patent Application Publication No. 2021/0061021, which is owned by the same Assignee as the instant Application, The Goodyear Tire & Rubber Company, and which is incorporated herein in its entirety.

When employed, the time filter 72 yields a regularized footprint length 74 for the tire 12. In addition, when the analysis module 52 employs the event filter 62, the denormalization filter 64, and/or the time filter 72, the regularized footprint length 74 is input into a prediction model 76 to generate the irregular wear determination 54 for the tire 12. The prediction model 76 preferably is a non-linear regression model. By way of background, non-linear regression models are a form of regression analysis in which observational data are modeled by a function that is a nonlinear combination of the model parameters, and depends on one or more independent variables. Examples of non-linear regression models that may be employed in the prediction model 76 include a Random Forest Regressor, an XgBoost Regressor, and a CatBoost Regressor.

If the regularized footprint length 74 remains the same or increases, the prediction model 76 determines that the tire 12 is experiencing uneven wear. When the prediction model 76 determines that the tire 12 is experiencing uneven wear, the analysis module 52 generates the irregular wear determination 54.

Figure 8:
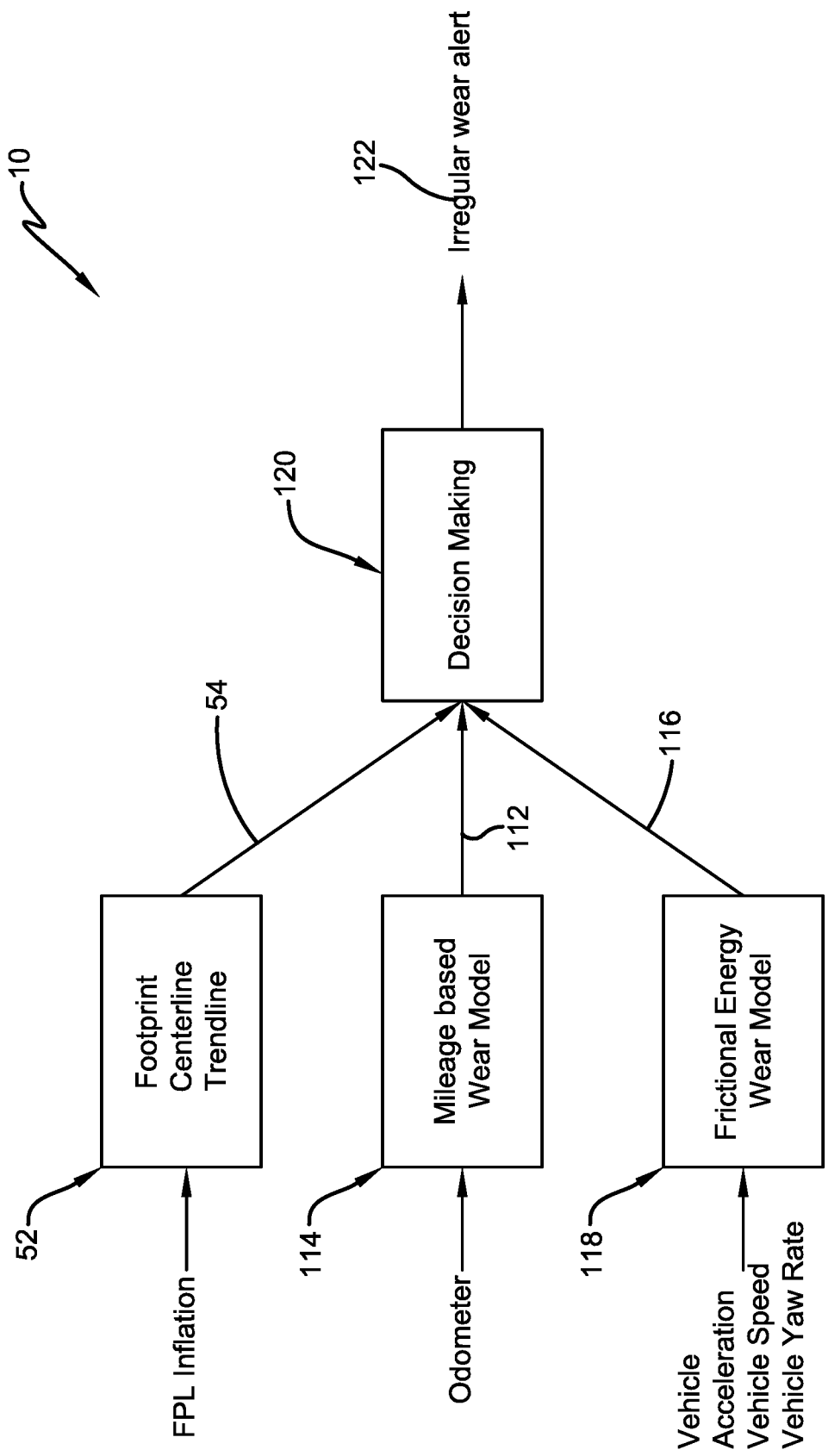
FIG. 8 is a flow diagram showing use of optional inputs from additional models in the irregular wear detection system of the present invention.

Turning to FIG. 8, in order to increase the accuracy of the irregular wear determination 54, the irregular wear detection system 10 may employ inputs from additional models. For example, the irregular wear detection system 10 may receive an additional input 112 from a mileage-based model 114. The technique employed in the mileage-based model 114 is described in greater detail in U.S. Patent Application Publication No. 2018/0272813, which is owned by the same Assignee as the instant Application, The Goodyear Tire & Rubber Company, and which is incorporated herein in its entirety. The mileage-based model 114 indicates when the vehicle 14 has been driven for a high number of miles, which in turn provides an indication that the tire 12 has experienced wear. A comparison of the input 112 from the mileage-based model 114 and the irregular wear determination 54 from the analysis module 52 may improve the accuracy of the irregular wear detection system 10.

The irregular wear detection system 10 may receive another input 116 from a frictional-energy model 118. The technique employed in the frictional-energy model 118 is described in greater detail in U.S. Pat. No. 9,873,293, which is owned by the same Assignee as the instant Application, The Goodyear Tire & Rubber Company, and which is incorporated herein in its entirety. The frictional-energy model 118 indicates when the vehicle 14 has accumulated high frictional energy, which in turn provides an indication that the tire 12 has experienced wear. A comparison of the input 116 from the frictional-energy model 118 and the irregular wear determination 54 from the analysis module 52 may improve the accuracy of the irregular wear detection system 10.

The comparison of the irregular wear determination 54 from the analysis module 52, the input 112 from the mileage-based model 114, and/or the input 116 from the frictional-energy model 118 preferably is executed in a comparator 120. For example, when the irregular wear determination 54 from the analysis module 52 exceeds a predetermined irregular wear threshold, and when the input 112 from the mileage-based model 114 exceeds a predetermined threshold, the comparator 120 causes the system 10 to generate an irregular wear alert 122. Likewise, when the irregular wear determination 54 from the analysis module 52 exceeds a predetermined irregular wear threshold, and when the input 116 from the frictional-energy model 118 exceeds a predetermined threshold, the comparator 120 causes the system 10 to generate the irregular wear alert 122. In this manner, the additional inputs 112 and 116 from the mileage-based model 114 and the frictional-energy model 118, respectively, may increase the accuracy of the irregular wear determination 54 made by the irregular wear detection system 10.

Figure 10:
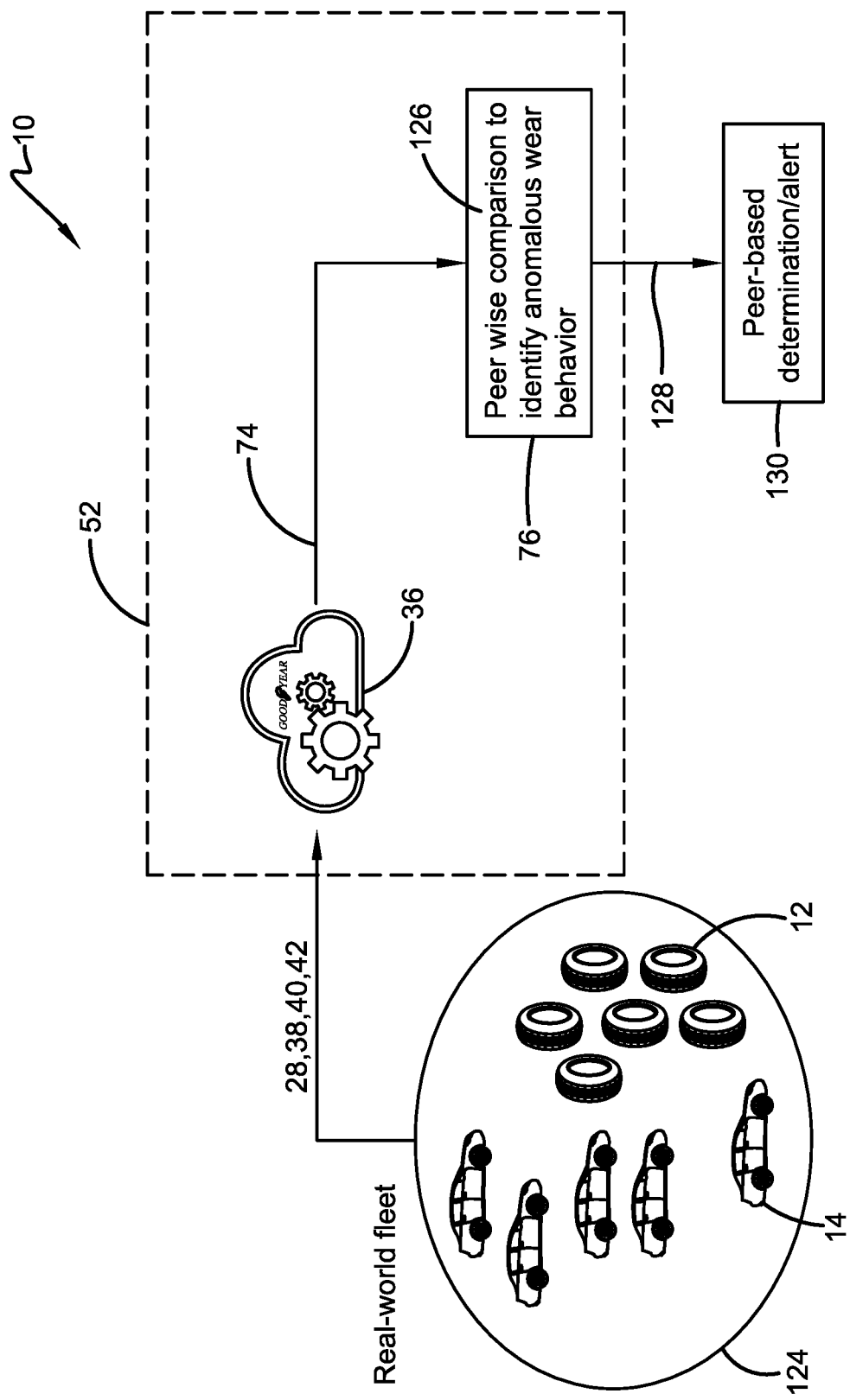
FIG. 10 is a flow diagram showing use of a peer-based comparison in the irregular wear detection system of the present invention.

Turning to FIG. 10, as another option to increase the accuracy of the irregular wear determination 54, the irregular wear detection system 10 may employ a peer-based comparison. More particularly, when multiple vehicles 14 with similar platforms employ similar tires 12 that are available for analysis, such as vehicles in a fleet 124, a peer comparator 126 may be used. Similar tires 12 include tires with the same stock keeping unit (SKU) identification, the same product code, and the like. The data for each one of the similar tires 12, including the footprint centerline length 28, the tire pressure 38, the tire temperature 40, and the optional tire ID information 42, are transmitted to the processor 36 and the analysis module 52 in the manner that is described above.

The analysis module 52 analyzes the inputs as described above to generate the regularized footprint length 74 for each tire 12. The prediction model 76 includes the peer comparator 126, which compares the regularized footprint lengths 74 among the tires 12 to examine trends. Because the tires 12 are similar, the same trends among the regularized footprint lengths 74 should occur. When an anomaly 128 occurs in the trends of the regularized footprint lengths 74, it is detected by the peer comparator 126. The peer comparator 126 then generates a peer-based determination 130, which may include an irregular wear alert. The peer-based determination 130 may be more accurate in a vehicle fleet 124 than an individual irregular wear determination 54.

Figure 9:
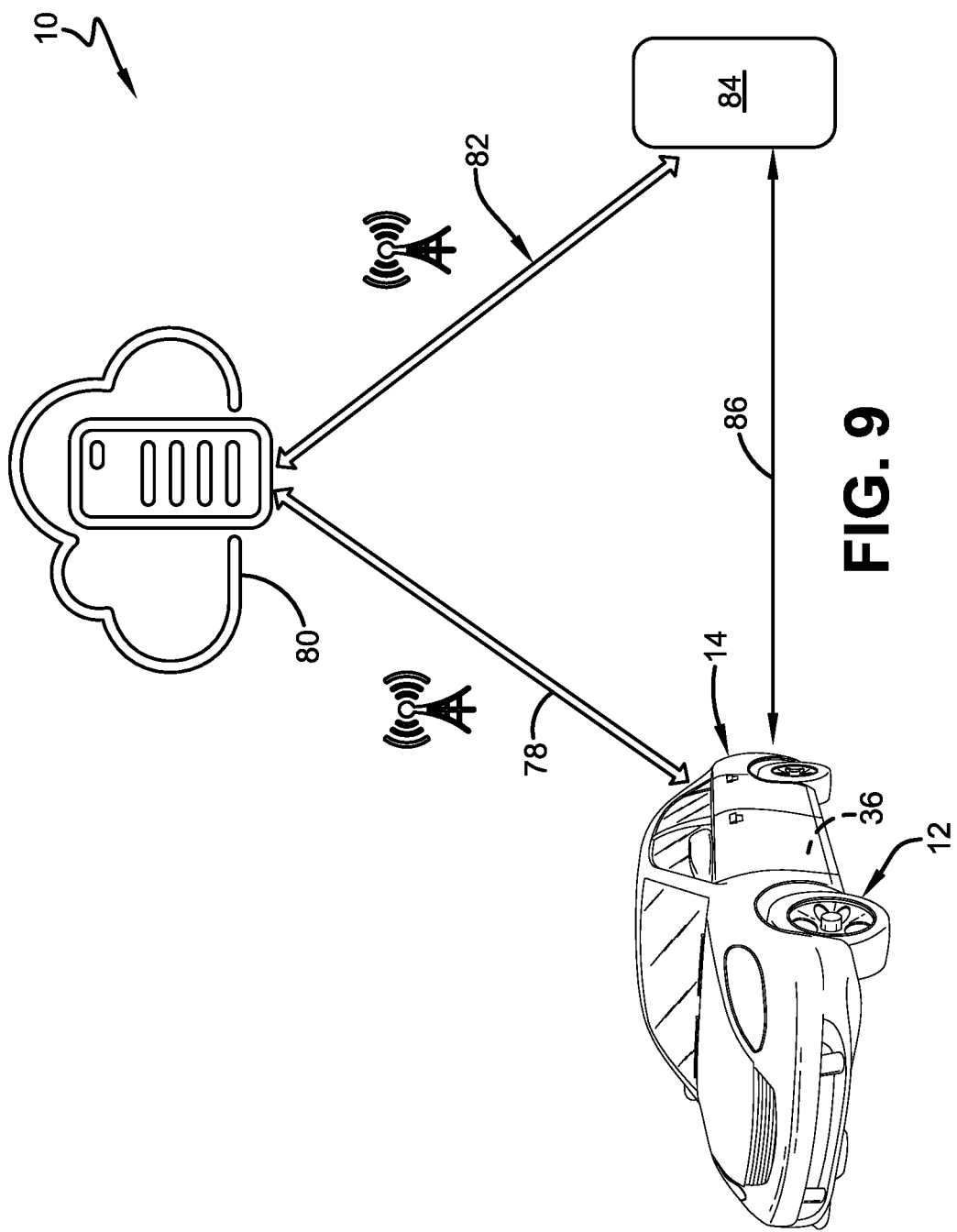
FIG. 9 is a schematic diagram of the vehicle shown in FIG. 1 with a representation of data or information transmission to a cloud-based server and to a user device.

Referring to FIG. 9, when the irregular wear determination 54 is generated for each tire 12, the data may be wirelessly transmitted 78 from the processor 36 on the vehicle 14 to a remote processor, such as a processor in a cloud-based server 80. The irregular wear determination 54 may be stored and/or remotely analyzed, and may also be wirelessly transmitted 82 to a display device 84 for a display that is accessible to a user of the vehicle 14, such as a smartphone. Alternatively, the irregular wear determination 54 may be wirelessly transmitted 86 from the processor 36 directly to the display device 84.

As mentioned above, when the irregular wear determination 54 exceeds a predetermined irregular wear threshold, an irregular wear alert 122 may be transmitted to the display device 84. The irregular wear detection system 10 thus may provide notice to a vehicle operator that one or more tires 12 are experiencing irregular wear. The notice may include a recommendation to check the inflation pressure of the tire, to check the alignment of the wheel 16, and/or to rotate the tires on the vehicle 14 to alleviate the irregular wear.

The irregular wear detection system 10 may also transmit or communicate the irregular wear determination 54 and/or the irregular wear alert 122 to a service center or a fleet manager. Moreover, the irregular wear detection system 10 may transmit or communicate the irregular wear determination 54 and/or the irregular wear alert 122 to an electronic control unit of the vehicle 14 and/or a vehicle control system, such as the braking system and/or the suspension system, to increase the performance of such systems.

In this manner, the irregular wear detection system 10 of the present invention detects irregular wear of a tire 12 wear based upon the footprint centerline length 28 of the tire. By analyzing whether the footprint length 28 remains the same or increases as the tread 20 of the tire 12 wears, the system 10 accurately and reliably detects irregular wear using easily obtained and accurate parameters. The irregular wear detection system 10 of the present invention provides an independent, standalone system that does not need to be integrated into the electronic systems of the vehicle 14 to function, including the CAN bus system.

The present invention also includes a method of detecting irregular wear of a tire 12. The method includes steps in accordance with the description that is presented above and shown in FIGS. 1 through 9.

It is to be understood that the structure and method of the above-described irregular wear detection system 10 may be altered or rearranged, or components or steps known to those skilled in the art omitted or added, without affecting the overall concept or operation of the invention. For example, electronic communication may be through a wired connection or wireless communication without affecting the overall concept or operation of the invention. Such wireless communications include radio frequency (RF) and Bluetooth® communications.

The invention has been described with reference to a preferred embodiment. Potential modifications and alterations will occur to others upon a reading and understanding of this description. It is to be understood that all such modifications and alterations are included in the scope of the invention as set forth in the appended claims, or the equivalents thereof.

What is claimed is:

1. An irregular wear detection system for a tire supporting a vehicle, the system comprising:
    a sensor unit being mounted on the tire, the sensor unit including a footprint centerline length measurement sensor to measure a centerline length of a footprint of the tire;
    a processor in electronic communication with the sensor unit, the processor receiving a plurality of measured centerline lengths of the footprint of the tire over time;
    an analysis module being stored on the processor, the analysis module receiving the measured centerline lengths as inputs and comparing the measured centerline lengths over time, wherein the analysis module detects irregular wear of the tire based upon the measured centerline lengths remaining the same or increasing; and
    an irregular wear determination being generated by the analysis module when the measured centerline lengths remain the same or increase.

2. The irregular wear detection system for a tire supporting a vehicle of claim 1, wherein the irregular wear detection system further comprises a comparator, the comparator receiving the irregular wear determination and inputs from at least one additional model.

3. The irregular wear detection system for a tire supporting a vehicle of claim 2, wherein the at least one additional model includes a mileage-based model.

4. The irregular wear detection system for a tire supporting a vehicle of claim 2, wherein the at least one additional model includes a frictional-energy model.

5. The irregular wear detection system for a tire supporting a vehicle of claim 1, wherein the processor includes transmission means to transmit the irregular wear determination to at least one of a display device, a service center, a fleet manager and a vehicle control system.

6. The irregular wear detection system for a tire supporting a vehicle of claim 5, wherein the processor includes transmission means to transmit a recommendation, the recommendation including at least one of checking the inflation pressure of the tire, checking the alignment of a wheel, and rotating a plurality of tires on the vehicle.

7. The irregular wear detection system for a tire supporting a vehicle of claim 1, wherein the analysis module further comprises a denormalization filter receiving the measured centerline length, a measured pressure of the tire, a measured temperature of the tire, identification information for the tire, and tire construction data as inputs, and generating a normalized footprint length.

8. The irregular wear detection system for a tire supporting a vehicle of claim 7, wherein the analysis module further comprises a historical footprint measurement database storing a historical log of footprint measurements, the historical footprint measurement database being in electronic communication with the processor, and wherein the normalized footprint length is correlated to the historical log of footprint measurements, and an average of the values is taken.

9. The irregular wear detection system for a tire supporting a vehicle of claim 8, wherein the analysis module further comprises a time filter, wherein the average of the values is applied to the time filter to account for time-scale decomposition of the tire, the time filter yielding a regularized footprint length for the tire.

10. The irregular wear detection system for a tire supporting a vehicle of claim 9, wherein the analysis module further comprises a prediction model that receives the regularized footprint length for the tire.

11. The irregular wear detection system for a tire supporting a vehicle of claim 10, wherein the prediction model includes a non-linear regression model.

12. The irregular wear detection system for a tire supporting a vehicle of claim 1, further comprising a vehicle-mounted collection unit to collect measurements of a speed of the vehicle and an inertia of the vehicle;
wherein the analysis module receives the speed of the vehicle and the inertia of the vehicle as inputs; and
the analysis module includes an event filter, wherein the speed of the vehicle and the inertia of the vehicle are compared to threshold values before further analysis is performed by the analysis module.

13. The irregular wear detection system for a tire supporting a vehicle of claim 12, wherein the speed of the vehicle is calculated from global positioning system data and the inertia of the vehicle is measured with an accelerometer.

14. The irregular wear detection system for a tire supporting a vehicle of claim 1, further comprising a peer comparator that detects an anomaly in trends among regularized footprint lengths of a plurality of similar tires.

15. A method for detecting irregular wear of a tire supporting a vehicle, the method comprising the steps of:
mounting a sensor unit on the tire, the sensor unit including a footprint centerline length measurement sensor;
measuring a centerline length of a footprint of the tire with the footprint centerline length measurement sensor;
providing a processor in electronic communication with the sensor unit;
receiving in the processor a plurality of measured centerline lengths of the footprint of the tire over time;
storing an analysis module on the processor;
receiving the measured centerline lengths in the analysis module as inputs;
comparing the measured centerline lengths over time;
detecting irregular wear of the tire based upon the measured centerline lengths remaining the same or increasing; and
generating an irregular wear determination with the analysis module when the measured centerline lengths remain the same or increase.

16. The method for detecting irregular wear of a tire supporting a vehicle of claim 15, further comprising the steps of:
providing a comparator; and
receiving in the comparator the irregular wear determination and inputs from at least one additional model.

17. The method for detecting irregular wear of a tire supporting a vehicle of claim 16, wherein the step of receiving in the comparator the irregular wear determination and inputs from at least one additional model includes receiving inputs from at least one of a mileage-based model and a frictional-energy model.

18. The method for detecting irregular wear of a tire supporting a vehicle of claim 15, further comprising the steps of:
providing a denormalization filter in the analysis module;
receiving the measured centerline length, a measured tire pressure, a measured tire temperature, identification information for the tire, and tire construction data as inputs in the denormalization filter;
generating a normalized footprint length with the denormalization filter;
storing a historical log of footprint measurements on a historical footprint measurement database being in electronic communication with the processor; and
correlating the normalized footprint length to the historical log of footprint measurements, and taking an average of the values.

19. The method for estimating the wear state of a tire supporting a vehicle of claim 18, further comprising the steps of:
providing a time filter in the analysis module;
applying the average of the values to the time filter to yield a regularized footprint length for the tire; and
inputting the regularized footprint length into a prediction model.

20. The method for estimating the wear state of a tire supporting a vehicle of claim 15, further comprising the steps of:
providing a vehicle-mounted collection unit to collect measurements of a speed of the vehicle and an inertia of the vehicle;
receiving the speed of the vehicle and the inertia of the vehicle as inputs into the analysis module;
providing an event filter in the analysis module; and
comparing the speed of the vehicle and the inertia of the vehicle to threshold values with the event filter before performing further analysis with the analysis module.

* * * * *